(12) United States Patent
Adibhatla et al.

(10) Patent No.: US 8,490,404 B1
(45) Date of Patent: Jul. 23, 2013

(54) SENSOR-BASED PERFORMANCE-SEEKING GAS TURBINE ENGINE CONTROL

(75) Inventors: Sridhar Adibhatla, Glendale, OH (US); Deepak Manohar Kamath, Cincinnati, OH (US); William Randolph Shinkle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 13/407,004

(22) Filed: Feb. 28, 2012

(51) Int. Cl.
 *F02C 1/00* (2006.01)

(52) U.S. Cl.
 USPC .............................................. 60/772; 60/773

(58) Field of Classification Search
 USPC ............ 60/772, 773, 793, 794, 795; 700/286, 700/287; 701/100, 102
 See application file for complete search history.

(56) References Cited

U.S. PATENT DOCUMENTS

| | | | |
|---|---|---|---|
| 4,159,088 A | | 6/1979 | Cosley |
| 5,448,881 A | * | 9/1995 | Patterson et al. ............... 60/794 |
| 5,908,176 A | | 6/1999 | Gilyard |
| 6,341,247 B1 | * | 1/2002 | Hreha et al. ...................... 701/3 |
| 6,459,963 B1 | | 10/2002 | Bennett et al. |
| 6,487,490 B1 | | 11/2002 | Kamath et al. |
| 6,823,675 B2 | | 11/2004 | Brunell et al. |
| 6,985,781 B2 | * | 1/2006 | Keeler et al. ..................... 700/44 |
| 8,276,363 B2 | * | 10/2012 | Seely et al. ...................... 60/243 |
| 2006/0212281 A1 | * | 9/2006 | Mathews et al. .................. 703/7 |
| 2007/0055392 A1 | * | 3/2007 | D'Amato et al. ............... 700/44 |
| 2010/0023238 A1 | * | 1/2010 | Adibhatla ..................... 701/100 |
| 2010/0024536 A1 | * | 2/2010 | Adibhatla et al. ......... 73/112.01 |

FOREIGN PATENT DOCUMENTS

EP 1178196 7/2009

* cited by examiner

*Primary Examiner* — Phutthiwat Wongwian
(74) *Attorney, Agent, or Firm* — General Electric Company; Matthew P. Hayden; David J. Clement

(57) ABSTRACT

Sensor-based, performance-seeking control of gas turbine engines is disclosed. An example method of controlling a gas turbine engine may include varying an engine input parameter while operating the gas turbine engine to produce a desired output, including measuring a pre-adjustment value of an engine operating parameter with an engine input parameter at an initial value, adjusting the engine input parameter to a current adjusted value, and measuring a post-adjustment value of the engine operating parameter. The method may include determining a future adjusted value of the engine input parameter and iteratively repeating the varying the engine input parameter operation and the determining the future adjusted value of the engine input parameter operation. The method may be performed while operating the gas turbine engine to produce a desired output.

19 Claims, 4 Drawing Sheets

SENSOR-BASED PERFORMANCE-SEEKING GAS TURBINE ENGINE CONTROL

BACKGROUND

The subject matter disclosed herein relates generally to gas turbine engines and, more particularly, to methods and apparatus for controlling the operation of gas turbine engines.

Some gas turbine engines may include a compressor section, a combustor section, and at least one turbine section. The compressor compresses air, which is mixed with fuel and channeled to the combustor. The mixture is then ignited, generating hot combustion gases. The combustion gases are channeled to the turbine, which extracts energy from the combustion gases for powering the compressor, as well as producing useful work to power a load, such as an electrical generator, or to propel an aircraft in flight.

In some gas turbine engines, certain control parameters may be adjusted based upon the operating status of the engine. For example, in a gas turbine engine configured to propel an aircraft or drive an electrical generator, the angular position of variable stator vanes in the compressor may be configured to vary with corrected core speed, such as according to predetermined schedule. The predetermined schedule may be established such that the engine should produce at least a minimum expected amount of thrust or power output and maintain a minimum required stall margin throughout the operating envelope, while accounting for a full range of engine-to-engine manufacturing quality variations, deterioration of engine components over many years of operation in service, control sensor measurement errors, changes in operating conditions (e.g., humidity), and the like. As a result, and by design, the engine may produce a reduced level of thrust or power output or suboptimal level of efficiency, below its potential capability, in many circumstances.

The problem: Operation of gas turbines at suboptimal control parameter settings due to the use of a predetermined schedule for certain control parameters may impact fuel efficiency, operating temperatures, engine life, exhaust emissions, etc.

BRIEF DESCRIPTION

The solution for the above-mentioned problem is provided by the present disclosure to include example embodiments, provided for illustrative teaching and not meant to be limiting.

An example method of controlling operation of a gas turbine engine according to at least some aspects of the present disclosure may include varying an engine input parameter while operating the gas turbine engine to produce a desired output. Varying the engine input parameter may include measuring a pre-adjustment value of an engine operating parameter while operating the gas turbine engine with the engine input parameter at an initial value while producing the desired output, adjusting the engine input parameter to a current adjusted value, the current adjusted value differing from the initial value, and measuring a post-adjustment value of the engine operating parameter while operating the gas turbine engine with the engine input parameter at the adjusted value and while producing the desired output. An example method may include determining a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter. An example method may include iteratively repeating the varying the engine input parameter operation and the determining the future adjusted value of the engine input parameter operation, using the current adjusted value of a prior iteration as the initial value for a subsequent iteration and the future adjusted value from the prior iteration as the current adjusted value for the subsequent iteration.

An example control system for a gas turbine engine according to at least some aspects of the present disclosure may include an operating parameter sensor operable to measure an engine operating parameter associated with a gas turbine engine; an output sensor operable to measure an output of the gas turbine engine; an actuator operable to modulate an engine input parameter (e.g., variable stators, variable inlet guide vanes, variable bleed or bypass airflow, cooling airflow to turbine nozzles or casings, or combustor fuel flow distribution patterns) associated with the gas turbine engine; a processor operatively coupled to the operating parameter sensor, the output sensor, and the actuator; and a storage medium operatively coupled to the processor, the storage medium comprising machine-readable instructions. The machine readable instructions may operatively enabling the processor to: receive a pre-adjustment value of the engine operating parameter (such as thrust/power output, turbine inlet/exhaust temperatures, exhaust emissions, fuel efficiency) measured by the operating parameter sensor (or calculated using an analytical model operating on data measured by the operating parameter sensor), cause the actuator to adjust the engine input parameter from an initial value to a current adjusted value while operating the gas turbine engine to substantially maintain the output of the gas turbine engine at a desired output as measured by the output sensor, receive a post-adjustment value of the engine operating parameter measured by the operating parameter sensor, determine a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter, and iteratively adjust the engine input parameter and determine the future adjusted value of the engine input parameter, using the current adjusted value of a prior iteration as the initial value for a subsequent iteration and the future adjusted value from the prior iteration as the current adjusted value for the subsequent iteration, while operating the gas turbine engine to substantially maintain the output of the gas turbine engine at the desired output.

An example storage medium according to at least some aspects of the present disclosure may include non-transitory, machine-readable instructions stored thereon, which, if executed by one or more processors, may operatively enable a gas turbine engine control system to vary an engine input parameter while operating a gas turbine engine associated with the gas turbine engine control system to produce a desired output, including: measure a pre-adjustment value of an engine operating parameter while operating the gas turbine engine with the engine input parameter at an initial value while producing the desired output, adjust the engine input parameter to a current adjusted value, the current adjusted value differing from the initial value, and measure a post-adjustment value of the engine operating parameter while operating the gas turbine engine with the engine input parameter at the adjusted value and while producing the desired output. Example machine-readable instructions may operatively enable the gas turbine engine control system to determine a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter. Example machine-readable instructions may operatively enable the gas turbine engine control system to iteratively vary the engine input parameter and determine the future adjusted value of the engine input parameter, using the current adjusted value of a prior iteration as the initial value for a subsequent iteration and the future adjusted value from the prior iteration as the current adjusted value for the subsequent iteration.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
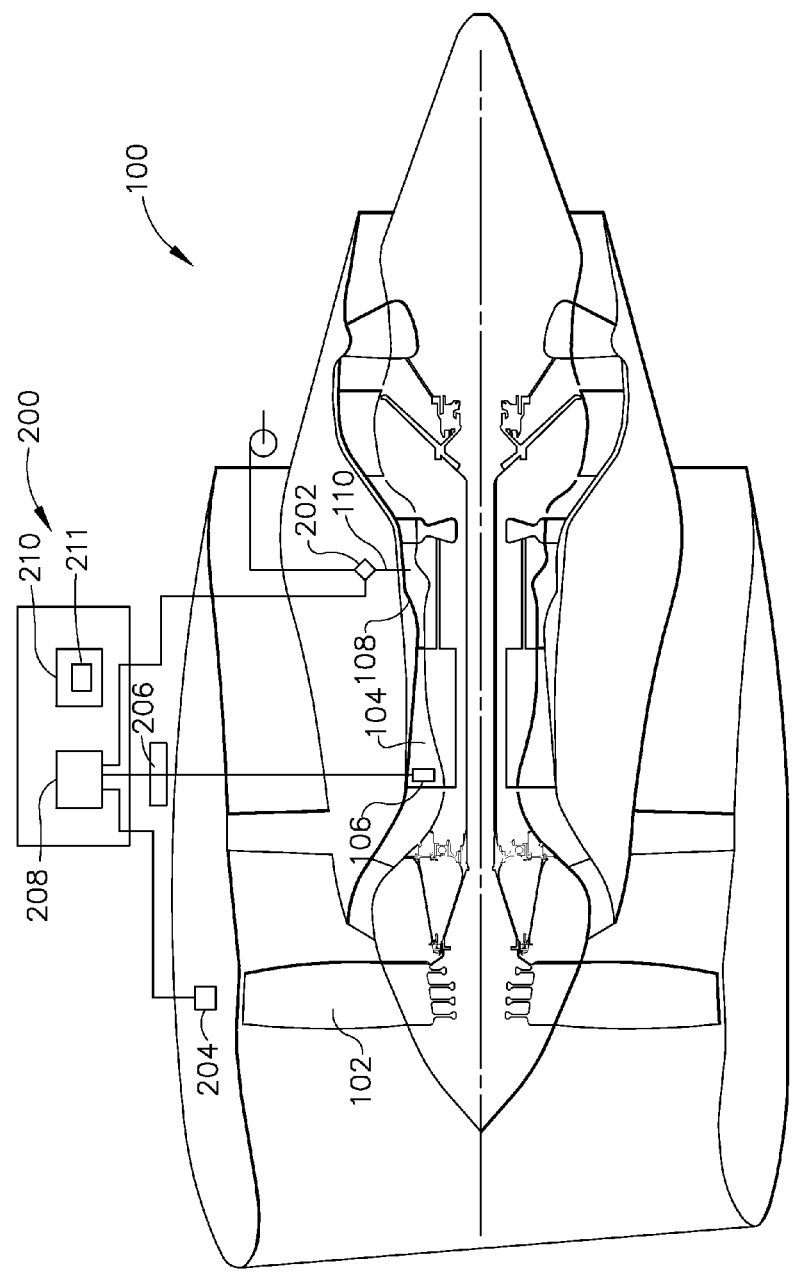
FIG. 1 is a block diagram of an example gas turbine engine configured to propel an aircraft.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, methods and apparatus for controlling the operation of gas turbine engines and, more specifically, to sensor-based, performance-seeking methods and apparatus for controlling the operation of gas turbine engines.

The present disclosure contemplates that it may be impractical to directly measure an amount of thrust produced by a gas turbine engine, such as a gas turbine engine propelling an aircraft in flight. Accordingly, some gas turbine engines may use control systems configured to indirectly ascertain the amount of thrust being produced. Some such control systems may infer engine thrust from parameters that can be measured, such as a rotational speed of a fan or an engine pressure ratio (EPR) (e.g., a ratio of the turbine exhaust stream pressure to the engine inlet total pressure). For example, some control systems may be configured to modulate fuel flow to a gas turbine engine as necessary to produce a fan speed corresponding to an aircraft throttle position. Similarly, some control systems may be configured to modulate fuel flow to a gas turbine engine as necessary to produce an EPR corresponding to an aircraft throttle position. Different aircraft throttle positions may correspond with different fan speeds and/or EPRs, such that advancing the throttle may result in increasing thrust.

Some example embodiments according to at least some aspects of the present disclosure may include a control system for a gas turbine engine. An example control system may include an operating parameter sensor configured to measure a gas turbine engine operating parameter; an output sensor configured to measure an output of the gas turbine engine; an actuator configured to modulate an engine input parameter; a processor operatively coupled to the operating parameter sensor, the output sensor, and the actuator; and a storage medium operatively coupled to the processor. The storage medium may include machine-readable instructions stored thereon.

In some example embodiments according to at least some aspects of the present disclosure, the machine-readable instructions may be executable by the processor and/or may operatively enable the processor to control at least some aspects of the operation of the gas turbine engine. In some example embodiments, the technical effect is the control at least some aspects of the operation of the gas turbine engine. For example, the machine-readable instructions may enable the processor to receive a pre-adjustment value of the engine operating parameter measured by the operating parameter sensor. The machine-readable instructions may enable the processor to cause the actuator to adjust the engine input parameter from an initial value to a current adjusted value while operating the gas turbine engine to substantially maintain the output of the gas turbine engine at a desired output as measured by the output sensor. The machine-readable instructions may enable the processor to receive a post-adjustment value of the engine operating parameter measured by the operating parameter sensor. The machine-readable instructions may enable the processor to determine a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter. The machine-readable instructions may enable the processor to iteratively adjust the engine input parameter and determine the future adjusted value of the engine input parameter, using the current adjusted value of a prior iteration as the initial value for a subsequent iteration and the future adjusted value from the prior iteration as the current adjusted value for the subsequent iteration, while operating the gas turbine engine to substantially maintain the output of the gas turbine engine at the desired output.

As used herein, optimal may refer to a value that is more desirable or satisfactory than other values. For example and without limitation, an optimal value of an engine input parameter may refer to a value that corresponds to a minimum fuel flow rate, a maximum electrical power output, a maximum efficiency, a minimum exhaust emissions measurement, a minimum heat rate, and/or a minimum power turbine inlet temperature. As used herein, optimal value may refer a more desirable or satisfactory value in light of certain constraints, such as limits on particular operating parameters associated with the engine, regardless of whether the optimal value is strictly a mathematical minimum or maximum value. For example, gas turbine engines may be operated within certain operating limits, which may be established in view of performance, safety, reliability, etc. As used herein, an optimal value of an engine input parameter may refer to a more desirable or satisfactory value that still allows the gas turbine engine to operate within the operating limits.

Some example embodiments according to at least some aspects of the present disclosure may be arranged for use in connection with aircraft engines. FIG. 1 is a block diagram of an example gas turbine engine (GTE) 100, which may be configured to propel an aircraft, according to at least some aspects of the present disclosure. GTE 100 may include a control system 200. Control system 200 may include an operating parameter sensor 202, which may be configured to measure an operating parameter comprising, for example, a fuel flow rate of fuel 110 supplied to GTE 100. Control system 200 may include an output sensor 204, which may be configured to measure an output comprising, for example, a fan 102 speed of GTE 100 and/or an EPR of GTE 100. Control system 200 may include an actuator 206, which may be configured to modulate a position of a variable stator vane 106 in a compressor 104 of GTE 100, which may comprise an engine input parameter. Some example engines may comprise a plurality of variable stator vanes, and an input parameter may comprise one or more positions of one or more variable stator vanes 106. Control system 200 may include a processor 208, which may be operatively coupled to operating parameter sensor 202, output sensor 204, and/or actuator 206. Control system 200 may include a storage medium 210, which may be operatively coupled to processor 208. Storage medium 210 may include machine-readable instructions 211, which may be executable by processor 208.

In some example embodiments according to at least some aspects of the present disclosure, control system 200 may be configured to control the fuel flow rate of fuel 110 to GTE 100 to provide a desired fan 102 speed and/or a desired engine pressure ratio. The optimal value of the engine input parameter may include a position of the variable stator vane 106 that corresponds to a minimum fuel flow rate that substantially maintains the desired output (e.g., desired fan speed and/or desired engine pressure ratio).

Figure 2:
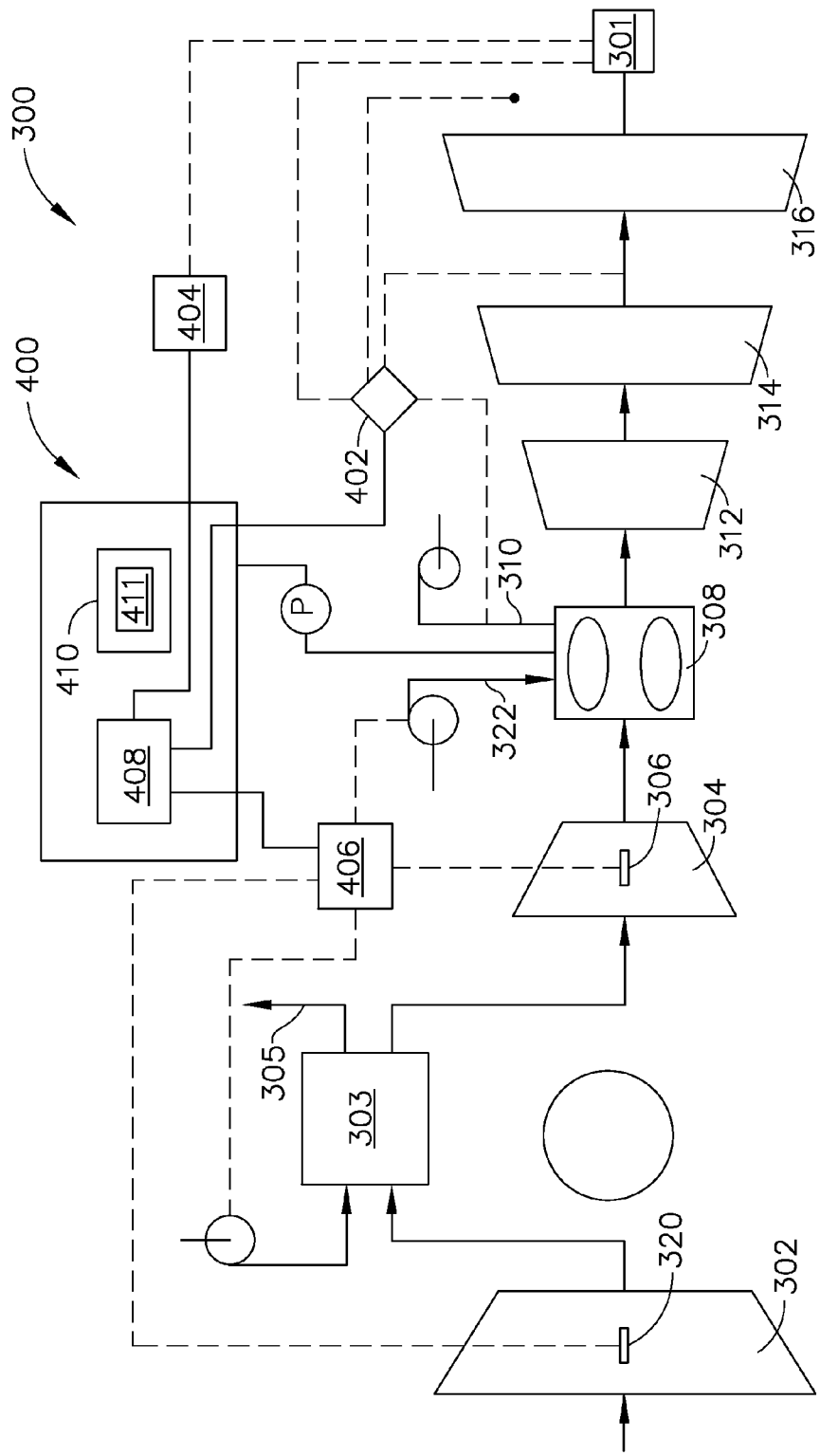
FIG. 2 is a block diagram of an example gas turbine engine arranged to drive an electrical generator.

Some example embodiments according to at least some aspects of the present disclosure may include gas turbine engines configured for electrical power generation. FIG. 2 is a block diagram of an example gas turbine engine (GTE) 300, which may be arranged to drive an electrical generator 301, according to at least some aspects of the present disclosure. GTE 300 may include a low-pressure compressor 302, an intercooler 303, a high-pressure compressor 304, a combustor 308, a high-pressure turbine 312, an intermediate-pressure turbine 314, and a power turbine 316. Power turbine 316 may be operatively coupled to drive electrical generator 301.

An example GTE 300 may include a control system 400. Control system 400 may include an operating parameter sensor 402, which may be configured to measure an operating parameter comprising, for example, an electrical power output of generator 301, an efficiency of GTE 300, an exhaust emissions parameter (e.g., $NO_x$ concentration), a heat rate of GTE 300, a fuel flow rate of fuel 310 supplied to GTE 300, and/or a power turbine inlet temperature associated with a power turbine of GTE 300. Control system 400 may include an output sensor 404, which may be configured to measure an output parameter comprising, for example, an electrical output of generator 301 (e.g., alternating current frequency and/or electrical power output). Control system 400 may include an actuator 406, which may be configured to modulate an engine input parameter comprising, for example, a high-pressure compressor inlet temperature associated with a high-pressure compressor of GTE 300 (e.g., by controlling the flow of cooling water 305 through an intercooler 303), a position of a variable stator vane 306 associated with high-pressure compressor 304, a position of a variable inlet guide vane 320 associated with booster 302, and/or a flow rate of injection water 322 supplied to combustor 308. Control system 400 may include a processor 408, which may be operatively coupled to operating parameter sensor 402, output sensor 404, and/or actuator 406. Control system 400 may include a storage medium 410, which may be operatively coupled to processor 408. Storage medium 410 may include machine-readable instructions 411, which may be executable by processor 408.

In some example embodiments, engine input parameters may include, without limitation, variable stators, variable inlet guide vanes, variable bleed or bypass airflow, cooling airflow to turbine nozzles and/or casings, and/or combustor fuel flow distribution patterns. In some example embodiments, engine operating parameters may include, without limitation, thrust/power output, turbine inlet/exhaust temperatures, exhaust emissions, and/or fuel efficiency.

As used herein, heat rate may refer to a ratio given by fuel flow rate multiplied by fuel heating value divided by power output.

In some example embodiments according to at least some aspects of the present disclosure, control system 400 may be configured to control the fuel flow rate of fuel 310 to GTE 300 to provide a desired electrical power output of generator 301 and/or a desired power turbine 316 speed. The optimal value of the engine input parameter may correspond to, for example, a maximum electrical power output, a maximum efficiency, a minimum exhaust emissions measurement (e.g., $NO_x$), a minimum heat rate, a minimum fuel flow rate, and/or a minimum power turbine 316 inlet temperature.

Figure 3:
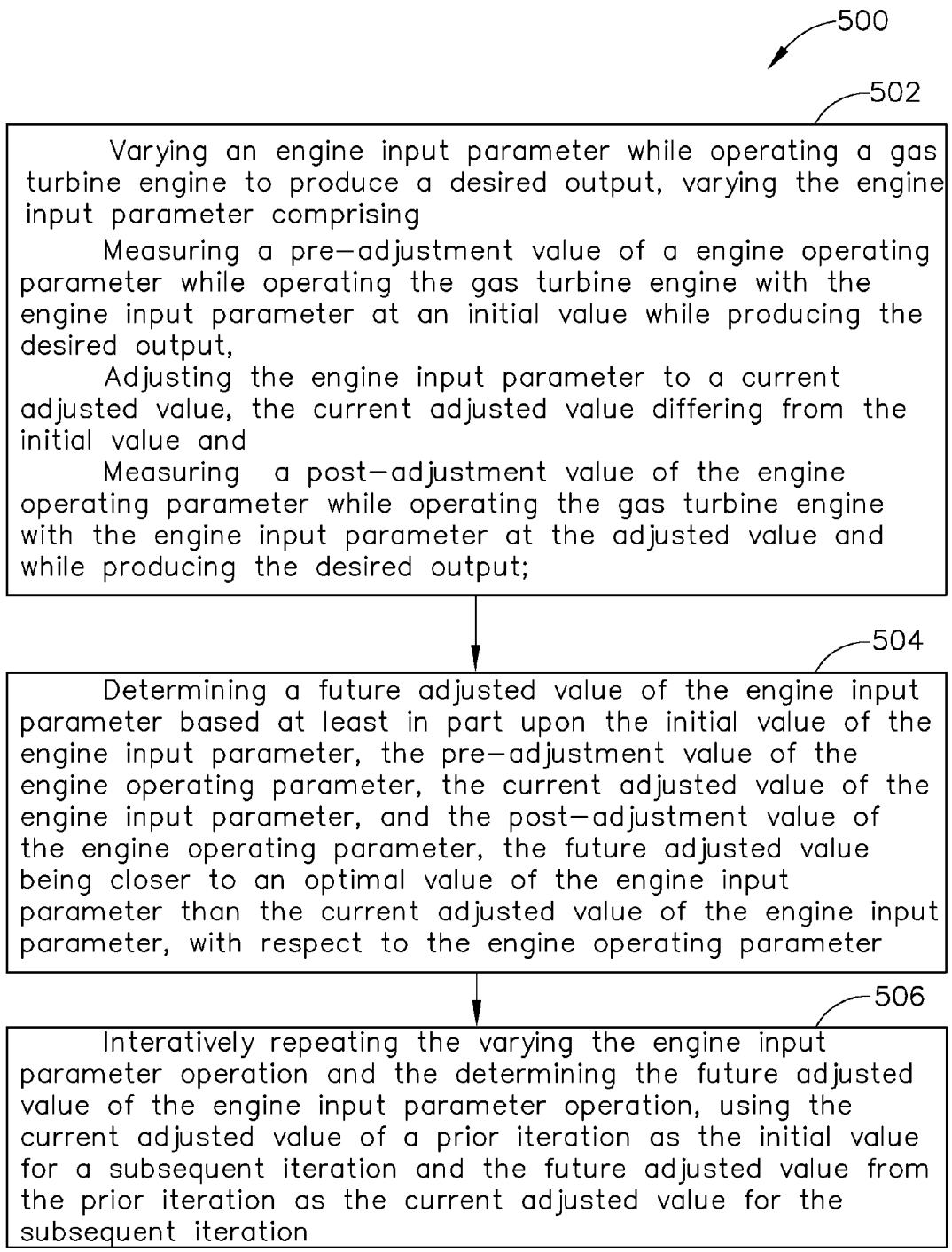
FIG. 3 is a flow diagram of an example method of controlling operation of a gas turbine engine.

FIG. 3 is a flow diagram of an example method 500 of controlling operation of a gas turbine engine, according to at least some aspects of the present disclosure. Method 500 of controlling operation of a gas turbine engine may begin with operation 502, which may include varying an engine input parameter while operating a gas turbine engine to produce a desired output. Varying the engine input parameter may include measuring a pre-adjustment value of an engine operating parameter while operating the gas turbine engine with the engine input parameter at an initial value while producing the desired output, adjusting the engine input parameter to a current adjusted value, the current adjusted value differing from the initial value, and/or measuring a post-adjustment value of the engine operating parameter while operating the gas turbine engine with the engine input parameter at the adjusted value and while producing the desired output. Operation 502 may be followed by operation 504, which may include determining a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter. Operation 504 may be followed by operation 506, which may include iteratively repeating the varying the engine input parameter operation and the determining the future adjusted value of the engine input parameter operation, using the current adjusted value of a prior iteration as the initial value for a subsequent iteration and the future adjusted value from the prior iteration as the current adjusted value for the subsequent iteration.

In some example methods according to at least some aspects of the present disclosure, operating the gas turbine engine to produce the desired output may include controlling a fuel flow rate of fuel to the gas turbine engine to provide the desired output. The desired output may include a desired value of a parameter associated with thrust produced by the engine, such as a desired fan speed and/or a desired engine pressure ratio. The engine operating parameter may include the fuel flow rate. The engine input parameter may include a position of a variable stator vane associated with a compressor of the gas turbine engine. The optimal value of the engine input parameter may include the position of the variable stator vane that corresponds to a minimum fuel flow rate that produces the desired output.

In some example methods according to at least some aspects of the present disclosure, the desired output may include a desired electrical output of a generator operatively coupled to the gas turbine engine. The engine operating parameter may include an electrical power output of the generator, an efficiency of the gas turbine engine, an exhaust emissions measurement associated with the gas turbine engine, a heat rate of the gas turbine engine, a fuel flow rate of fuel supplied to the gas turbine engine, and/or a power turbine inlet temperature associated with a power turbine of the gas turbine engine, for example. The engine input parameter may include a high-pressure compressor inlet temperature associated with a high-pressure compressor of the gas turbine engine, a position of a variable stator vane associated with the high-pressure compressor, a position of a variable inlet guide vane associated with a booster of the gas turbine engine, and/or an injection water flow rate of injection water supplied to a combustor of the gas turbine engine, for example. The optimal value of the engine input parameter may correspond to a maximum electrical power output, a maximum efficiency, a minimum exhaust emissions measurement, a minimum heat rate, a minimum fuel flow rate, and/or a minimum power turbine inlet temperature, for example.

In some example methods according to at least some aspects of the present disclosure, the desired electrical output may include a desired alternating current frequency and/or a desired electrical power output.

In some example methods according to at least some aspects of the present disclosure, a method may include, prior to varying the engine input parameter while operating the gas turbine engine, determining that the gas turbine engine is operating in a pseudo-steady-state condition. For example, a gas turbine engine may be mounted to an aircraft and the pseudo-steady-state condition may include cruise, climb, and/or descent. As another example, a gas turbine engine may be operatively coupled to a generator and the pseudo-steady-state condition may include a substantially constant electrical power output of the generator.

In some example methods according to at least some aspects of the present disclosure, the engine input parameter may consist of a single parameter, and determining the future adjusted value of the engine input parameter may include parametric optimization. Parametric optimization may be performed using any of the well-known optimization techniques for univariate optimization, such as the bisection technique or the gradient search.

In some example methods according to at least some aspects of the present disclosure, the engine input parameter may include a plurality of parameters, and determining the future adjusted value of the engine input parameter may be performed using any of the well-known techniques for multivariate optimization including gradient-based optimization such as conjugate gradient or Newton techniques, gradient-free search such as Hooke-Jeeves pattern search, or population-based methods such as genetic algorithms.

Some example methods according to at least some aspects of the present disclosure may include storing the current adjusted value of the engine input parameter during a first period of pseudo-steady state operation of the gas turbine engine and using the stored current adjusted value as the initial value of the engine input parameter in a second period of pseudo-steady state operation. The first period of pseudo-steady state operation and the second period of pseudo-steady state operation may be separated by an intervening period of non-steady-state operation.

Figure 4:
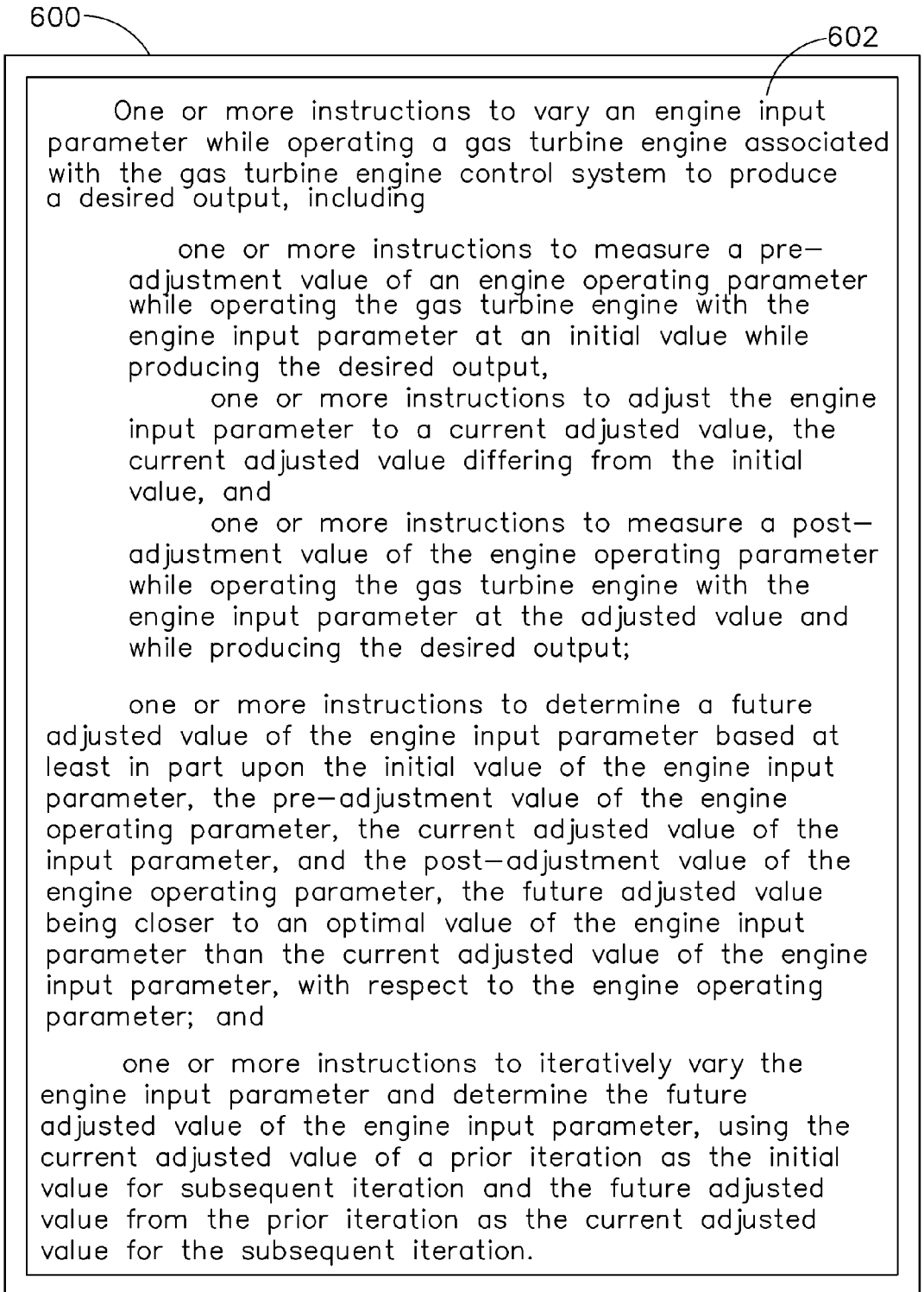
FIG. 4 is a block diagram illustrating an example storage medium; all in accordance with at least some aspects of the present disclosure.

FIG. 4 is a block diagram illustrating an example storage medium 600, according to at least some aspects of the present disclosure. Storage medium 600 may include one or more sets of non-transitory, machine-readable instructions 602 stored thereon. Machine-readable instructions 602 may be executable by one or more processors (e.g., processor 208 and/or processor 408), which may operatively enable a gas turbine engine control system (e.g., control system 200 and/or control system 400) to perform a method of controlling operation of a gas turbine engine, such as the method generally described above and illustrated in FIG. 3. In some example embodiments, storage medium 600 may comprise a computer program product, a computer-readable medium, and/or a recordable medium.

Depending on the desired configuration, processor 208 and/or processor 408 may be of any type including but not limited to a microprocessor, a microcontroller, a digital signal processor, or any combination thereof. Depending on the desired configuration, storage medium 210 and/or storage medium 410 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by processor 208 and/or processor 408.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling operation of a gas turbine engine, the method comprising:
varying an engine input parameter while operating a gas turbine engine to produce a desired output, varying the engine input parameter comprising
measuring a pre-adjustment value of an engine operating parameter while operating the gas turbine engine with the engine input parameter at an initial value while producing the desired output, adjusting the engine input parameter to a current adjusted value, the current adjusted value differing from the initial value, and measuring a post-adjustment value of the engine operating parameter while operating the gas turbine engine with the engine input parameter at the adjusted value and while producing the desired output;

determining a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter; and iteratively repeating the varying the engine input parameter operation and the determining the future adjusted value of the engine input parameter operation, using the current adjusted value of a prior iteration as the initial value for a subsequent iteration and the future adjusted value from the prior iteration as the current adjusted value for the subsequent iteration.

2. The method of claim 1, wherein operating the gas turbine engine to produce the desired output comprises controlling a fuel flow rate of fuel to the gas turbine engine to provide the desired output, the desired output comprising at least one of a desired fan speed and a desired engine pressure ratio;

wherein the engine operating parameter comprises the fuel flow rate;

wherein the engine input parameter comprises a position of a variable stator vane associated with a compressor of the gas turbine engine; and wherein the optimal value of the engine input parameter comprises the position of the variable stator vane that corresponds to a minimum fuel flow rate that produces the desired output.

3. The method of claim 1, wherein the desired output comprises a desired electrical output of a generator operatively coupled to the gas turbine engine;

wherein the engine operating parameter comprises at least one of an electrical power output of the generator, an efficiency of the gas turbine engine, an exhaust emissions measurement associated with the gas turbine engine, a heat rate of the gas turbine engine, a fuel flow rate of fuel supplied to the gas turbine engine, and a power turbine inlet temperature associated with a power turbine of the gas turbine engine;

wherein the engine input parameter comprises at least one of a high-pressure compressor inlet temperature associated with a high-pressure compressor of the gas turbine engine, a position of a variable stator vane associated with the high-pressure compressor, a position of a variable inlet guide vane associated with a booster of the gas turbine engine, and an injection water flow rate of injection water supplied to a combustor of the gas turbine engine; and wherein the optimal value of the engine input parameter corresponds to at least one of a maximum electrical power output, a maximum efficiency, a minimum exhaust emissions measurement, a minimum heat rate, a minimum fuel flow rate, and a minimum power turbine inlet temperature.

4. The method of claim 3, wherein the desired electrical output comprises at least one of a desired alternating current frequency and a desired electrical power output.

5. The method of claim 1, further comprising, prior to varying the engine input parameter while operating the gas turbine engine, determining that the gas turbine engine is operating in a pseudo-steady-state condition.

6. The method of claim 5, wherein the gas turbine engine is mounted to an aircraft; and wherein the pseudo-steady-state condition comprises one of cruise, climb, or descent.

7. The method of claim 5, wherein the gas turbine engine is operatively coupled to a generator; and wherein the pseudo-steady-state condition comprises a substantially constant electrical power output of the generator.

8. The method of claim 1, wherein the engine input parameter consists of a single parameter; and wherein determining the future adjusted value of the engine input parameter comprises univariate optimization.

9. The method of claim 1, wherein the engine input parameter comprises a plurality of parameters; and wherein determining the future adjusted value of the engine input parameter comprises multivariate optimization.

10. The method of claim 1, further comprising storing the current adjusted value of the engine input parameter during a first period of pseudo-steady state operation of the gas turbine engine; and using the stored current adjusted value as the initial value of the engine input parameter in a second period of pseudo-steady state operation;

wherein the first period of pseudo-steady state operation and the second period of pseudo-steady state operation are separated by an intervening period of non-steady-state operation.

11. A control system for a gas turbine engine, the control system comprising:

an operating parameter sensor operable to measure an engine operating parameter associated with a gas turbine engine;

an output sensor operable to measure an output of the gas turbine engine;

an actuator operable to modulate an engine input parameter associated with the gas turbine engine;

a processor operatively coupled to the operating parameter sensor, the output sensor, and the actuator; and a storage medium operatively coupled to the processor, the storage medium comprising machine-readable instructions operatively enabling the processor to:

receive a pre-adjustment value of the engine operating parameter measured by the operating parameter sensor, cause the actuator to adjust the engine input parameter from an initial value to a current adjusted value while operating the gas turbine engine to substantially maintain the output of the gas turbine engine sensor at a desired output as measured by the output sensor, receive a post-adjustment value of the engine operating parameter measured by the operating parameter sensor, determine a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter, and iteratively adjust the engine input parameter and determine the future adjusted value of the engine input parameter, using the current adjusted value of a prior iteration as the initial value for a subsequent iteration and the future adjusted value from the prior iteration as the current adjusted value for the subsequent iteration, while operating the gas turbine engine to substantially maintain the output of the gas turbine engine at the desired output.

12. The control system of claim 11, wherein operating the gas turbine engine to substantially maintain the output of the gas turbine engine at the desired output comprises controlling a fuel flow rate of fuel to the gas turbine engine to provide the desired output, the desired output comprising at least one of a desired fan speed and a desired engine pressure ratio;

wherein the engine operating parameter comprises the fuel flow rate;

wherein the engine input parameter comprises a position of a variable stator vane associated with a compressor of the gas turbine engine; and wherein the optimal value of the engine input parameter comprises the position of the variable stator vane that corresponds to a minimum fuel flow rate that substantially maintains the desired output.

13. The control system of claim 11, wherein the desired output comprises a desired electrical output of a generator operatively coupled to the gas turbine engine;

wherein the engine operating parameter comprises at least one of an electrical power output of the generator, an efficiency of the gas turbine engine, an exhaust emissions measurement associated with the gas turbine engine, a heat rate of the gas turbine engine, a fuel flow rate of fuel supplied to the gas turbine engine, and a power turbine inlet temperature associated with a power turbine of the gas turbine engine;

wherein the engine input parameter comprises at least one of a high-pressure compressor inlet temperature associated with a high-pressure compressor of the gas turbine engine, a position of a variable stator vane associated with the high-pressure compressor, a position of a variable inlet guide vane associated with a booster of the gas turbine engine, and an injection water flow rate of injection water supplied to a combustor of the gas turbine engine; and wherein the optimal value of the engine input parameter corresponds to at least one of a maximum electrical power output, a maximum efficiency, a minimum exhaust emissions measurement, a minimum heat rate, a minimum fuel flow rate, and a minimum power turbine inlet temperature.

14. The control system of claim 11, wherein the desired electrical output comprises at least one of a desired alternating current frequency and a desired electrical power output.

15. The control system of claim 11, wherein the machine-readable instructions operatively enable the gas turbine engine control system to determine that the gas turbine engine is operating in a pseudo-steady-state condition prior to varying the engine input parameter.

16. A storage medium comprising non-transitory, machine-readable instructions stored thereon, which, if executed by one or more processors, operatively enable a gas turbine engine control system to:

vary an engine input parameter while operating a gas turbine engine associated with the gas turbine engine control system to produce a desired output, including measure a pre-adjustment value of an engine operating parameter while operating the gas turbine engine with the engine input parameter at an initial value while producing the desired output, adjust the engine input parameter to a current adjusted value, the current adjusted value differing from the initial value, and measure a post-adjustment value of the engine operating parameter while operating the gas turbine engine with the engine input parameter at the adjusted value and while producing the desired output;

determine a future adjusted value of the engine input parameter based at least in part upon the initial value of the engine input parameter, the pre-adjustment value of the engine operating parameter, the current adjusted value of the engine input parameter, and the post-adjustment value of the engine operating parameter, the future adjusted value being closer to an optimal value of the engine input parameter than the current adjusted value of the engine input parameter, with respect to the engine operating parameter; and iteratively vary the engine input parameter and determine the future adjusted value of the engine input parameter, using the current adjusted value of a prior iteration as the initial value for a subsequent iteration and the future adjusted value from the prior iteration as the current adjusted value for the subsequent iteration.

17. The storage medium of claim 16, wherein operating the gas turbine engine to produce the desired output comprises controlling a fuel flow rate of fuel to the gas turbine engine to provide the desired output, the desired output comprising a desired value of a parameter associated with thrust produced by the gas turbine engine;

wherein the engine operating parameter comprises the fuel flow rate;

wherein the engine input parameter comprises a position of a variable stator vane associated with a compressor of the gas turbine engine; and wherein the optimal value of the engine input parameter comprises the position of the variable stator vane that corresponds to a minimum fuel flow rate that produces the desired output.

18. The storage medium of claim 16, wherein the desired output comprises at least one of a desired alternating current frequency and a desired electrical power output of a generator operatively coupled to the gas turbine engine;

wherein the engine operating parameter comprises at least one of the electrical power output of the generator, an efficiency of the gas turbine engine, an exhaust emissions measurement associated with the gas turbine engine, a heat rate of the gas turbine engine, a fuel flow rate of fuel supplied to the gas turbine engine, and a power turbine inlet temperature associated with a power turbine of the gas turbine engine;

wherein the engine input parameter comprises at least one of a high-pressure compressor inlet temperature associated with a high-pressure compressor of the gas turbine engine, a position of a variable stator vane associated with the high-pressure compressor, a position of a variable inlet guide vane associated with a booster of the gas turbine engine, and an injection water flow rate of injection water supplied to a combustor of the gas turbine engine; and wherein the optimal value of the engine input parameter corresponds to at least one of a maximum electrical power output, a maximum efficiency, a minimum exhaust emissions measurement, a minimum heat rate, a minimum fuel flow rate, and a minimum power turbine inlet temperature.

19. The storage medium of claim 16, wherein the machine-readable instructions operatively enable the gas turbine engine control system to determine that the gas turbine engine is operating in a pseudo-steady-state condition prior to varying the engine input parameter.

* * * * *